United States Patent [19]

Bourgraf et al.

[11] 4,369,985

[45] Jan. 25, 1983

[54] ONE MAN CART FOR ARTICLES

[75] Inventors: Elroy E. Bourgraf, Cincinnati; Robert E. Dunn, Washington Court House; Ronald D. Vance, Wilmington, all of Ohio

[73] Assignee: Burt Weil, Cincinnati, Ohio

[21] Appl. No.: 220,161

[22] Filed: Dec. 24, 1980

[51] Int. Cl.³ ................................................ B62B 1/00
[52] U.S. Cl. .................................... 280/641; 280/43.1; 280/645; 296/20
[58] Field of Search ............... 280/640, 641, 643, 645, 280/651, 652, 43.1, 47.2; 296/20; 5/82, 83

[56] References Cited

U.S. PATENT DOCUMENTS 3,752,527  8/1973  Ferneau ................................ 296/20

FOREIGN PATENT DOCUMENTS 2043547  10/1980  United Kingdom ............... 280/47.2

Primary Examiner—Joseph F. Peters, Jr.
Assistant Examiner—John A. Carroll
Attorney, Agent, or Firm—Wood, Herron & Evans

[57] ABSTRACT

A one man cart for carrying articles of merchandise having a main horizontal frame having auxiliary wheels at the forward end thereof, a pair of rear legs pivoted from the front of said main frame and inclined downwardly and rearwardly, a toggle brace pivoted to the rear of said main frame and inclined downwardly and forwardly and pivoted to said rear legs, front legs pivoted to the front of said frame and extending substantially vertically downwardly. A mechanism is provided to lock and unlock said front legs so that they may be pivoted rearwardly for operations such as moving the cart up and down stairs while holding the cart by an extension of the rear legs at the front of the cart. The toggle braces for the rear legs are pivotal to unlock the rear legs. A mechanism provided at the rear of the cart is operable to sequentially unlock the front legs and thereafter the rear legs to permit the cart to be thrust into a vehicle pivoting the front legs and rear legs sequentially while the cart is supported by the auxiliary wheels riding on the deck of the vehicle.

8 Claims, 10 Drawing Figures

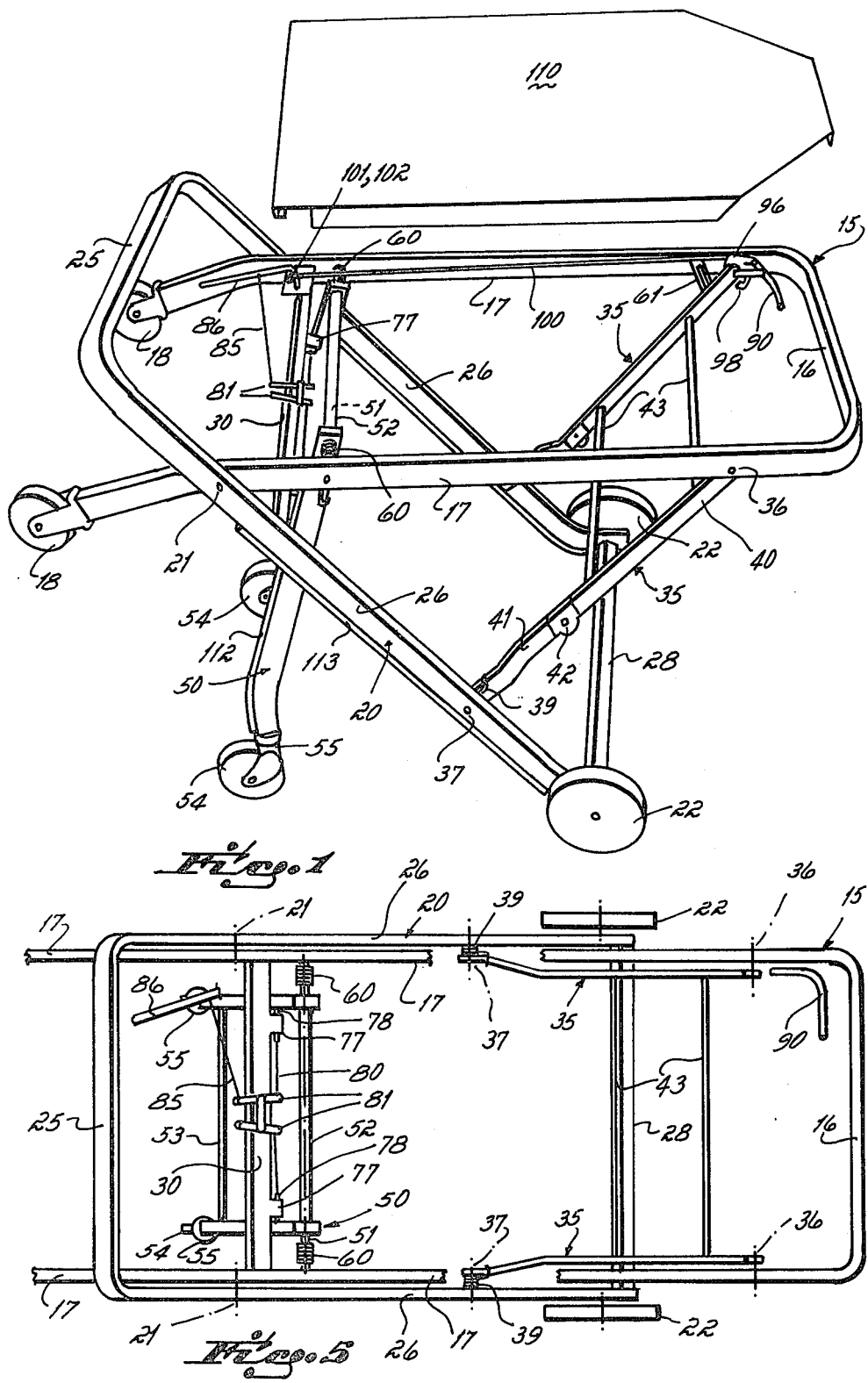

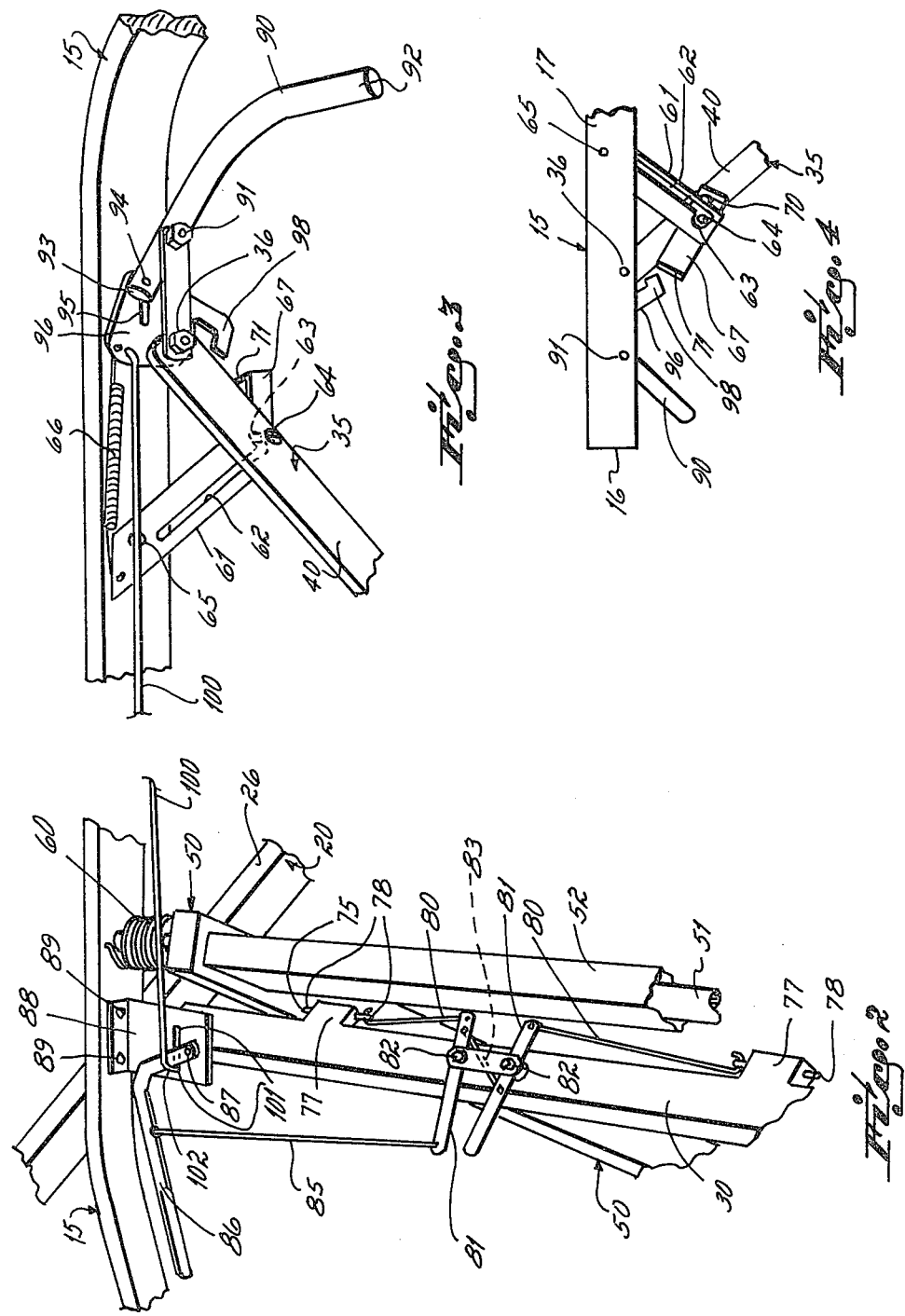

ONE MAN CART FOR ARTICLES

This invention relates to a cart which is primarily for transporting heavy articles of merchandise, for example, up to about 300 pounds, from a vehicle to another location.

The invention is an improvement on the cart described in U.S. Pat. No. 3,752,527. The objective of carts of this type has been primarily to provide an erect position wherein the carts can be rolled from place to place, a folded position wherein the cart can be folded to as low a profile as possible to permit the cart with its merchandise on the bed of the cart to be placed into a vehicle, and to provide an intermediate position wherein one set of legs is swung out of the way so that the cart can be moved as a two-wheeled truck for ease in going up and down stairs, over high curbs and the like.

In general, all of these operations are to be performed by one person, for example a salesman, without the assistance of a second person.

While the '527 patent has all of the foregoing attributes, it has been an objective of the present invention to provide the improvements over the cart of the '527 patent, these improvements including the following:

(a) Greater simplicity of construction.
(b) Capability of handling a heavier weight.
(c) A larger fore and aft wheel base.
(d) Greater ease of operating on stairways.
(e) A lower profile at the forward position.
(f) A lower height in the erected position so that the merchandise can be demonstrated at about desk top level.
(g) A sequential release of the forward legs followed by the rearward legs so that the cart, as it is thrust into the vehicle, is supported by the rear legs, after the front legs are released until the cart is thrust a substantial distance into the vehicle.

The features of the invention will become more readily apparent from the following detailed description taken in conjunction with the accompanying drawings in which:

FIG. 1 is a perspective view of the cart with the sheet metal platform disassembled;

FIG. 2 is an enlarged fragmentary perspective view of the left encircled portion of FIG. 1;

FIG. 3 is an enlarged fragmentary perspective view of the right encircled portion of FIG. 1;

FIG. 4 is an enlarged fragmentary side elevational view of a lock mechanism for the rear legs;

FIG. 5 is a top plan view of the cart with the sheet metal platform removed;

Figure 6:
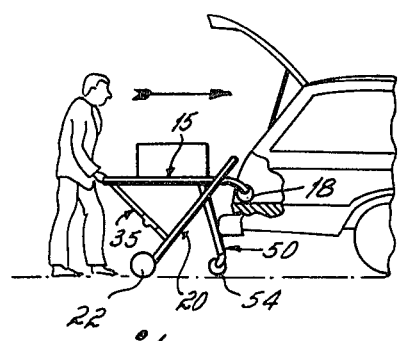
FIGS. 6–10 are diagrammatic views illustrating the operation of the cart.
Figure 7:
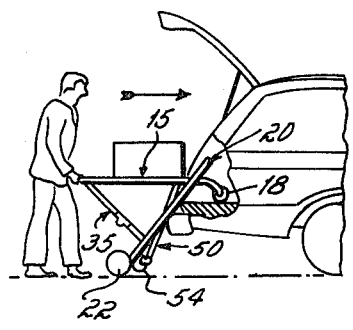
Figure 8:
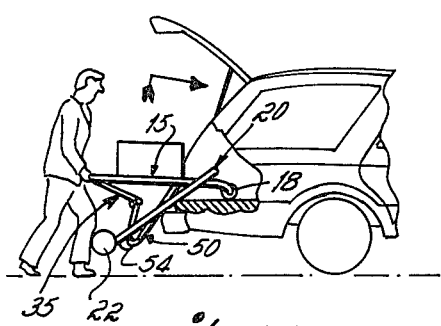

Referring to FIG. 1, the cart includes a main horizontal frame 15 which is U-shaped, having the bight portion 16 of the U at the rear of the cart and having forwardly-extending horizontal sections 17 terminating in auxiliary wheels 18. Rear legs 20 are pivoted at 21 to the forward end of the main frame 15 and are inclined downwardly and rearwardly, terminating in wheels 22. The rear legs 20 are formed of a U-shaped frame member having a bight portion 25 projecting well above the level of the main frame 15, this bight portion forming a handle at the front of the cart where the operator supports the cart when the cart is riding only on the rear wheels as, for example, going up stairs and over high curbs. From the bight portion, downwardly and inclined sections 26 are joined at their lower ends by a cross bar 28 welded thereto to provide a rigid, generally rectangular frame forming the rear legs. A tubular rod, not shown, passes through the tubular transverse member 28 and the wheels 22 are mounted by means of bearings on that rod.

At the upper end portion of the legs, a similar transverse bar 30 extends across the frame sections 26 to brace the legs and to provide a mount for locks on the front legs, as will be described. The legs are pivoted to the main horizontal frame by bolts 21.

A pair of downwardly and forwardly inclined toggle braces 35 are pivoted by bolts 36 at their upper ends to the horizontal main frame and by bolts 37 at their lower ends to the legs 20. At the lower ends of the braces, coil springs 39 are connected between the legs and the braces to urge the braces toward an erect over-center position. Each brace includes an upper section 40 and a lower section 41. The upper and lower sections are pivoted together at 42. The upper sections are joined by transverse tubes 43 which are welded between the two sections.

A pair of front legs 50 are pivotally mounted on a transverse rod 51 secured at the forward end portion of the horizontal frame. Transverse tubes 52 and 53 are welded to the legs to form a rigid, generally rectangular frame structure. The front legs terminate at their lower ends in wheels 54 mounted on swivel casters 55 to facilitate the steering of the cart.

Figure 9:
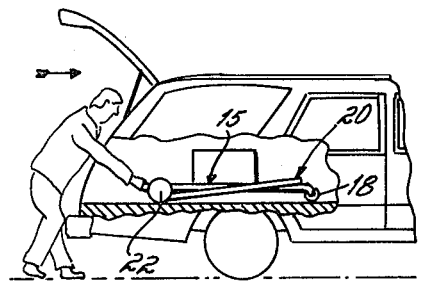

The width of the rearward legs is greater than the width of the horizontal frame to which they are mounted. The width of the horizontal frame 15 is greater than the braces 365 and the width of the braces is greater than the width of the forward legs 50 so that when the cart is folded, the rear legs, frame, braces and front legs all nest within one another. In that folded condition, as shown in FIG. 9, the upper level of the main frame is about 5½ inches off the deck supporting it, this being a reduction from 8 inches of the cart of the '527 patent or about a 30% reduction in height. This is a significant reduction, particularly in light of the trend of smaller and smaller vehicles and the need for fitting quite sizeable items of merchandise into the vehicle.

At the upper ends of the front legs, a pair of coil springs 60 are connected between the horizontal frame 15 and the front legs 50 to urge the front legs to an erect position. The rear legs are provided with releasable locks connected between the horizontal frame and the over-center toggle braces 35 to lock the legs in a erect position to guard against inadvertently swinging the braces past the over-center position and inadvertently permitting the cart to collapse. The lock for the braces includes a lock bar 61 (FIG. 3) having an elongated slot 62 and a hook 63 in the slot. A bolt 64 rides in the slot, and when the hook 63 is engagement with the bolt, the braces are locked. The lock bar 61 is pivoted at 65 to the horizontal frame and a tension spring 66 urges the lock bar toward the lock position.

A lock release lever 67 is pivoted on the bolt 64 and carries at one end a pin 70 which is in engagement with the lock bar. At the other end, the release lever has a small handle 71. When the handle of the release lever is rotated downwardly, the pin 70 swings up against the lock bar to raise the hook portion 63 of the lock bar out of engagement with the bolt 64, thereby releasing the lock on the braces so that they can be pivoted to fold the rear legs.

The front legs also have a lock. Each front leg has a hole 75. The transverse bar 30 carries a pair of blocks 77 into which pins 78 are slidably mounted, the pins being projectable into the holes 75 on the front legs to lock them in an erect position. Compression springs (not shown) within the blocks urge the pins outward into engagement with the holes in the front legs. The pins are connected by wire rods 80 to spaced levers 81 which are pivoted by bolts 82 to the transverse bar 30. A small rod 83 connected between the levers 81 causes them to swing in unison when a force is applied to one of them.

One of the levers 83 is connected by a wire rod 85 to an L-shaped lever 86 pivoted by a bolt 87 to a bracket 88 which is in turn bolted at 89 to the horizontal frame. Pivoting of the lever 86 causes the levers 81 to swing in opposite directions thereby pulling the wire rods 80 together to pull the pins out of erative position and to return the pins 78 to their locked position.

The rear legs are provided with an operating lever 90 pivoted by a bolt 91 to the horizontal frame. The operating lever has a handle 92 at one end. The other end 93 is connected by a pin 94 to a slot 95 in a bellcrank lever 96. The bellcrank lever is pivoted on one of the bolts 36 by which one of the braces 35 is mounted to the horizontal frame. The bellcrank lever has an arm 98 which is engageable with the upper portion of one of the braces 35. When the bellcrank lever is pulled upwardly or counterclockwise, as viewed in FIG. 3, the pin 94 riding in the slot 95 swings the bellcrank lever in a clockwise direction which causes the arm 98 to engage the upper portion of the brace and to swing it slightly over-center, thereby releasing the brace on the rear legs.

The bellcrank lever 96 is connected by a rod 100 to the bracket 88 at the forward end of the cart. A slot 101 is provided in the bracket 88 and a hook-shaped end 102 of the rod 100 rides in the slot. The hook-shaped end 102 passes over the operating lever 86 at a location spaced from its pivot bolt 87 so that when tension is applied to the rod 100, its hook end pulls against the lever 86 to cause it to operate to release the front legs. The relationship of the elements is such that when the rearward lever 90 is operated, before effecting the release of the braces 35, it will pull upon the forward lever 86 to pull the pins from the forward legs, thereby releasing them. Thereafter, and with somewhat greater force, a continued rotation of the rear lever will cause the bellcrank lever 96 to release the rear braces. This sequence of operations is particularly useful in thrusting the cart into the rear of a vehicle wherein the front legs should be released first so that support of the cart and the article which it is carrying remains on the rear legs until after the cart is pushed a substantial distance into the vehicle.

The horizontal frame is preferably covered with a sheet metal platform 110 which, on its underside, should have channel-shaped sheet metal braces riveted thereto for rigidity. The sheet metal platform is preferable to board-type platforms heretofore used in that it reduces the overall height of the cart.

The forward surfaces of the front legs 50 are lines with nylon pads 112 and the forward surfaces of the rear legs are likewise lined with nylon pads 113 so as to reduce abrasion of the rear structure of the vehicle and the legs themselves as a cart is thrust into a vehicle.

The loading and unloading operation of the vehicle is illustrated in FIGS. 6-9. As shown in FIG. 6, the cart has been rolled up to the rear end of a station wagon and the auxiliary wheels 18 rest upon the deck of the vehicle. The operator first flips the release lever 67 to release the lock bar 61 from the bolt 64. The operator, standing at the rear of the cart and grasping the handle 92 of lever 90 in his hand, preferably gripping it and the bight portion 16 of the horizontal frame together, swings the handle upwardly. Rotation of the handle causes the bellcrank lever 96 to rotate and pulls the rod 100 rearwardly. The rearward movement of the rod 100 causes the front leg release lever 86 to rotate, thereby pulling the pins out of the front legs. When the front legs become unlocked, a forward thrusting of the cart causes the front legs to pivot rearwardly by their engagement with the bumper of the vehicle until they assume the position of FIG. 7.

During this transition, the braces for the rear legs have not been unlocked or released and therefore full support of the article and cart is provided by the rear legs, thereby reducing the strain on the operator.

As the rear legs engage the bumper of the vehicle, the operator continues his rotation of the handle 92 causing the operating lever to rotate the bellcrank lever 96 further thereby bringing the arm 98 into engagement with the upper ends of the toggle braces to swing them slightly in an upward direction which carries them past center to release the rear legs. Continued thrust of the cart toward the vehicle causes the rear legs and front legs to be carried simultaneously upwardly as viewed in FIG. 8. Once the cart is in the vehicle, it folds to the low profile of FIG. 9 in view of the nesting of the frame, braces and rear and front legs as described previously.

To unload the vehicle, the sequence of operations is simply reversed. As the cart is withdrawn, the rear legs first snap to the erect position through the force of gravity and partly through the springs on the toggle braces which snap them to the over-center position. The lock bar will also snap into a lock position because of the pivoting motion applied to it by the spring 66.

Continued withdrawal frees the front legs so that through the force of gravity and coil springs they snap to the erect position, and the pins, urged by the compression springs in block 77, snap into locked relation with the holes 75 in the legs.

Figure 10:
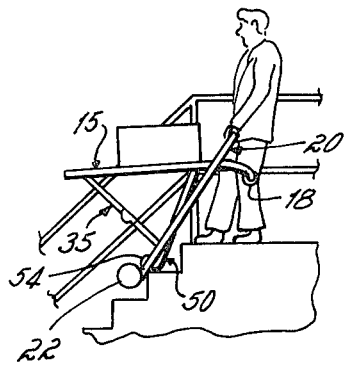

With the operator standing at the front of the cart grasping the upwardly-projecting bight portion 25 of the rear legs, the cart may be conditioned for going up and down stairs or over high curbs as viewed in FIG. 10. Standing at the front of the cart, the operator rotates the front leg operating lever 86 to pull on the wire rod 85 which, acting through the levers 81 and wire rods 80, pulls the pins 78 out of the holes 75 in the front legs. This operation does not affect the rear legs at all because there is no force applied to the rod 100. With the front legs released, they can be swung toward the rear legs until they reach the position shown in FIG. 10 where the cart is operable in a manner similar to that of a two-wheeled truck. It can be seen that the upper extension of the rear legs permits the operator to stand reasonably erect while holding onto the bight portion 25 of the rear legs. This is in contrast to a somewhat stooped position which the operator had to assume when performing a similar operation with the cart of the '527 patent, for in that patent it was necessary for the operator to grasp the forward extension of the horizontal frame.

By comparing the present structure to that of the '527 patent, it can be seen that the rearrangement of the leg support provides for a wider fore and aft wheel base, thereby improving the stability of the cart.

Another difference can be observed. In the '527 patent provision was made for an intermediate level of the horizontal frame between erect and folded positions. In the present application, again because of the rearrangement of the leg structure, the height of the horizontal frame in the erect position is lowered about 3 inches which is a suitable level for demonstration purposes.

Finally, the horizontal frame, both sets of legs and the braces are formed of lightweight, rectangular tubing so as to reduce the weight of the cart while providing improved strength.

Having described our invention, we claim:

1. A cart foldable between an erect and a folded position comprising:
   a horizontal main frame,
   auxiliary wheels mounted at the forward end of said main frame,
   a pair of downwardly and rearwardly inclined rear legs pivoted at their upper ends to said main frame,
   a pair of forward legs pivoted at their upper ends to the front portion of said main frame and depending generally vertically from said main frame,
   a releasable brace between said main frame and said rear legs to maintain them in an erect position,
   means releasably locking said front legs in an erect position,
   means at the forward end of the cart for releasing said front legs to permit them to swing rearwardly, and
   means at the rear end of the cart to release said braces for the rear legs and said front legs to permit said cart to be changed to a folded position.

2. The cart of claim 1 wherein said means at the rear of the cart includes a lost motion connection to said rear leg braces whereby operation of said release means releases said front legs and thereafter releases said rear legs.

3. The cart of claim 1 wherein said cart, when in folded condition, has its front legs nested within said rear leg braces, said rear leg braces nested in said horizontal frame, said horizontal frame nested within said rear legs to minimize the height of the cart when in folded condition.

4. The cart of claim 1 further comprising,
   an upwardly-projecting extension of said rear legs providing a handle for supporting the cart when said front legs are released and swung to an inoperative position.

5. The cart of claim 1 wherein releasable locking means for said front legs comprises,
   pins slidably mounted on said rear legs,
   said front legs having holes which receive said pins only when said front legs are in an erect position,
   said pins being connected to said means at the front of the cart for releasing said front legs.

6. A cart as in claim 5, said releasable means for said front legs further comprising,
   a pair of levers pivoted to a cross bar between said rear legs,
   rods connecting said levers to said pins,
   a rod connecting said pair of levers to an operating lever pivoted at the front of the cart whereby pivoting of said lever effects pivoting of said pair of levers to pull said pins from the holes in said front legs.

7. A cart as in claim 1 wherein said releasing means at the rear of the cart comprises,
   an operating lever pivoted to said horizontal frame,
   a bellcrank lever pivoted on the pivot axis of the upper end of said rear legs brace and connected by a slot in said bellcrank lever to a pin in an operating lever,
   said bellcrank lever having an arm which bears against said brace to release it when said bellcrank lever is rotated by rotating of said operating lever.

8. A cart as in claim 7 further comprising,
   a rod connected between said bellcrank lever and the front end of said cart,
   said rod being engageable with said operating means at the front of said cart to operate said operating means when said bellcrank lever is rotated.

* * * * *

UNITED STATES PATENT AND TRADEMARK OFFICE
CERTIFICATE OF CORRECTION

PATENT NO. : 4,369,985
DATED : January 25, 1983
INVENTOR(S) : Elroy E. Bourgraf; Robert E. Dunn; Ronald D. Vance It is certified that error appears in the above—identified patent and that said Letters Patent is hereby corrected as shown below:

Column 2, line 34, "365" should be -- 35 --

Column 2, line 50, "a" should be -- an --

Column 3, line 18, after "of" insert

-- the holes 75 in the legs. When the operating lever 86 is released, the compression springs in the blocks 77 push the pins back into the holes pulling on the wire rods 80, levers 81, wire rod 85 and operating lever 86 to return it to its inop- --

Column 3, lines 62, "lines" should be -- lined --

Column 6, line 30, "legs" should be -- leg --

Signed and Sealed this

Sixth Day of September 1983

[SEAL]

Attest:

GERALD J. MOSSINGHOFF

Attesting Officer  Commissioner of Patents and Trademarks